United States Patent
Fulford

(10) Patent No.: US 11,073,224 B2
(45) Date of Patent: Jul. 27, 2021

(54) VALVE ASSEMBLY

(71) Applicant: Weir Minerals Australia Ltd, Artarmon (AU)

(72) Inventor: John James Fulford, Bli Bli (AU)

(73) Assignee: WEIR MINERALS AUSTRALIA LTD

( * ) Notice: Subject to any disclaimer, the term of this patent is extended or adjusted under 35 U.S.C. 154(b) by 0 days.

(21) Appl. No.: 15/756,009

(22) PCT Filed: Aug. 26, 2016

(86) PCT No.: PCT/AU2016/050796
§ 371 (c)(1),
(2) Date: Feb. 27, 2018

(87) PCT Pub. No.: WO2017/031548
PCT Pub. Date: Mar. 2, 2017

(65) Prior Publication Data
US 2018/0299027 A1     Oct. 18, 2018

(30) Foreign Application Priority Data
Aug. 27, 2015   (AU) .................................. 2015903473

(51) Int. Cl.
*F16K 31/34*     (2006.01)
*F16K 31/22*     (2006.01)
(Continued)

(52) U.S. Cl.
CPC ............ *F16K 31/34* (2013.01); *B60K 15/035* (2013.01); *B60K 15/03519* (2013.01);
(Continued)

(58) Field of Classification Search
CPC ........ F16K 31/34; F16K 31/22; F16K 15/063; F16K 24/044; B60K 2015/03335;
(Continued)

(56) References Cited

U.S. PATENT DOCUMENTS

| 3,153,423 A | 10/1964 | Biello et al. |
| 5,836,351 A * | 11/1998 | Underwood, III .... F16K 17/196 137/587 |

(Continued)

FOREIGN PATENT DOCUMENTS

| AU | 2011100669 A4 | 7/2011 |
| WO | WO-2015/054717 A1 | 4/2015 |

OTHER PUBLICATIONS

Written Opinion of the International Searching Authority dated Oct. 14, 2016 for PCT/AU2016/050796, 4 pages.

*Primary Examiner* — Craig J Price
(74) *Attorney, Agent, or Firm* — Foley & Lardner LLP

(57) ABSTRACT

A valve assembly may be used with a container for holding a fluid including a liquid and a gas. The valve assembly may have a chamber, inlet, and outlet. The chamber may provide an exhaust route for fluid from the container to the outlet. A check valve including a sealing member with a through hole may move between an open and closed position. In the open position, check valve may provide a main flow route for fluid leaving the internal chamber. The through hole may provide a limited return flow route for gas returning to the internal chamber when the check valve is closed. The valve assembly may include a breather check valve movable between a closed and open position in which it provides fluid communication between the exhaust route and externally of the housing. A filter may communicate with the breather check valve.

19 Claims, 7 Drawing Sheets

(51) Int. Cl.
*F16K 15/06* (2006.01)
*F16K 24/04* (2006.01)
*B60K 15/035* (2006.01)
*B60K 15/03* (2006.01)

(52) U.S. Cl.
CPC .......... *F16K 15/063* (2013.01); *F16K 24/044* (2013.01); *F16K 31/22* (2013.01); *B60K 2015/03335* (2013.01); *B60K 2015/03368* (2013.01); *B60K 2015/03542* (2013.01); *B60K 2015/03576* (2013.01); *B60K 2015/03585* (2013.01); *Y10T 137/7404* (2015.04); *Y10T 137/7423* (2015.04)

(58) Field of Classification Search
CPC .......... B60K 2015/033368; B60K 2015/03542; B60K 2015/03576; B60K 2015/03585; B60K 15/035; B60K 15/03519; Y10T 137/7404; Y10T 137/0874; Y10T 137/3099; Y10T 137/7423; Y10T 137/7426; Y10T 137/7433; Y10T 137/7436; Y10T 137/7465; Y10T 137/7771; Y10T 137/7836; Y10T 137/86332; B67D 7/0476; B67D 7/048; B67D 7/44; B67D 7/54
USPC .......... 137/423, 43, 202, 429–433, 442, 493, 137/510, 588; 123/516, 518, 519, 520, 123/198 D; 141/44, 47, 59, 198
See application file for complete search history.

(56) References Cited

U.S. PATENT DOCUMENTS

| | | | |
|---|---|---|---|
| 6,085,771 | A | 7/2000 | Benjey et al. |
| 6,311,723 | B1 * | 11/2001 | Shipp ...................... G05D 9/04 137/413 |
| 7,793,682 | B2 * | 9/2010 | Smit ...................... B67D 7/365 137/202 |
| 8,025,076 | B2 | 9/2011 | Smit |
| 9,322,486 | B2 * | 4/2016 | Smit ...................... B67D 7/365 |
| 9,873,321 | B2 * | 1/2018 | Reed ................ B60K 15/03519 |
| 2011/0214759 | A1 * | 9/2011 | Grillmeier ........ B60K 15/03519 137/511 |
| 2011/0226356 | A1 | 9/2011 | Yamaguchi |

* cited by examiner

VALVE ASSEMBLY

CROSS REFERENCE TO RELATED APPLICATIONS

This application is filed under 37 U.S.C. 371, which claims priority to and the benefit of PCT/AU2016/050796, having a filing date of Aug. 26, 2016, which claims priority to and benefit of Australian Patent Application No. 2015903473, having a filing date of Aug. 27, 2015, both of which are hereby incorporated herein by reference in their entirety for all purposes.

TECHNICAL FIELD

This present disclosure relates to an improved valve assembly that may be used with various float valves. Float valves may be used as a component of a liquid filling system. Certain embodiments relate to a valve assembly that may be used as a component of a fast fill system that allows rapid filling of a container and also protects the container from being overfilled and/or over pressurised. Certain embodiments are directed a system and/or a component of a system that may be used to rapidly fill a fuel tank with fuel. The embodiments disclosed herein may also be used to in other suitable applications.

BACKGROUND ART

Large machinery or equipment fitted with fuel tanks is often equipped with a fast fill system to enable rapid filling of large capacity fuel tanks. Some of these systems have a fast fuel valve mounted or associated with the fuel container that permits rapid filling of the fuel container and also a breather valve that permits air to be vented from the container as it fills. The breather valve may also function to reduce the chances of over filling of the container and/or over pressurising of the container during filling. These rapid filling systems are mostly either non-pressure systems or pressure systems.

These fast fuel systems are often used in dusty environments such as a mine site where the introduction of unwanted dirt or other unwanted materials into the system may create problems with the function of the breather valve, the flow valve, and/or other components of the system as well as contaminating the fuel or other liquids being used.

These fast fuel systems typically function by use of a flow control valve that allows a fuel container to rapidly be filled but also have safety features to reduce the chances of over-filling the tank, prevent the build-up of pressure within the tank during and after filling, and/or prevent spilling of the fuel. The flow control valve may also prevent the fuel supply nozzle from being overridden, thus preventing the possibility of overfilling. The flow control valve is usually used in conjunction the breather valve that is used to determine when the level of fuel in the fuel tank is at a desired level. When the desired level of fuel has been attained, the breather valve communicates with the flow control valve to stop the flow of fuel into the container.

SUMMARY OF THE DISCLOSURE

In a first aspect, embodiments are disclosed of a valve assembly for use with a container for holding a fluid comprising a liquid and a gas, the valve assembly comprising: a housing having an internal chamber therein and an inlet and an outlet to and from the internal chamber, the internal chamber in use being in fluid communication with the container and providing for an exhaust route for fluid from the container to the outlet; a check valve including a sealing member movable between a check valve open position, and a check valve closed position, the sealing member having one or more through holes therein, the check valve when in the check valve open position providing for a main flow route for fluid leaving the internal chamber via the outlet, the through hole(s) in the sealing member providing for a limited return flow route for gas returning to the internal chamber via the outlet when the check valve is in the check valve closed position; and, a breather check valve movable between a breather valve open position in which it provides fluid communication between the exhaust route and externally of the housing and a breather valve closed position, and a filter which is in gas communication with the breather check valve for filtering gas before the gas enters the internal chamber and container.

In certain embodiments, the check valve may be disposed within the internal chamber.

In certain embodiments, the check valve comprises a poppet valve, the sealing member including a disc-shaped plug or poppet disc having a central axis, the through hole(s) extending through the poppet disc from one side to the other side thereof, the poppet valve further including a shaft or stem operatively connected to the poppet disc, the poppet disc being adapted to seat against a valve seat when the check valve is in the check valve closed position, the poppet disc being displaced from the valve seat when the check valve is in the check valve open position.

In certain embodiments, the check valve further includes a valve force transferring member which urges the check valve into the check valve closed position. In certain embodiments the valve force transferring member comprises a spring.

In certain embodiments, a plurality of the through holes are provided which are radially spaced from the central axis and spaced apart from one another around the poppet disc. In certain embodiments four through holes are provided.

In certain embodiments, the valve assembly may further include a relief valve disposed within the housing and including a relief plate movable between a relief valve closed position to a relief valve open position, the relief plate having at least one breather hole therein which forms part of the exhaust route; a breather float valve disposed within the housing adjacent to and upstream of the relief valve with respect to the fluid flow direction towards the outlet, the breather float valve including a breather float configured for movement between a breather float open position in which position flow can be effected through the one or more breather holes and a breather float closed position in which the breather float moves in a direction towards the relief plate so as to close the one or more breather hole.

In certain embodiments, the check valve is downstream of the relief valve and the breather float valve with respect to the fluid flow direction towards the outlet.

In certain embodiments, the housing comprises a top and a bottom end, the outlet being in the region of the top end and the inlet being in the region of the bottom end. In certain embodiments the housing comprises a main axis X-X extending in a direction from the top end to the bottom end and said check valve, relief valve and breather float valve are arranged to move between their open and closed positions in the axial direction X-X.

In certain embodiments the check valve, relief valve and breather float valve are generally axially aligned with the main axis X-X.

In a second aspect, embodiments are disclosed of valve apparatus for use with a container for holding a fluid comprising a liquid and a gas, the valve apparatus comprising a valve assembly as described in the first aspect, and an inlet float valve which includes an inlet float valve housing having a passageway therein which is in fluid communication with the exhaust route in the valve assembly housing, the inlet float valve further including an inlet float movable between an open position and a closed position in which position the passageway is closed.

In a third aspect, embodiments are disclosed of a system for use in the control of fluid flow to and from a container, the system comprising valve apparatus as described in the second aspect, a control valve and a bleed line, the inlet float valve being operatively connected to the control valve via the bleed line.

The valve assembly disclosed is adapted to function in different ways in response to various operating conditions. Normally the check valve and breather check valve are urged into their respective closed positions. During a container filling operation gas from the container enters the internal chamber of the valve assembly housing. This is as a result of gas within the container being displaced by liquid as the container is filled with liquid. This gas is delivered at a pressure sufficient to cause the check valve to open thereby enabling gas to pass from the chamber out through the outlet. The pressure and volume of gas is such that the check valve opens, in spite of the through-holes letting a limited amount of gas to pass therethrough. During the filling operation, the breather check valve is in its closed position.

After filling of the container, the check valve adopts its closed position so as to inhibit a main flow from the outlet back into the chamber via the check valve. The through holes permit a limited return of gas from the outlet, but this is a relative small volume. When the container is being emptied the breather float valve is caused to open thereby permitting gas to enter the chamber and pass to the container. As will be apparent, the arrangement is such that the major volume of gas enters the chamber via the breather check valve with a relatively small gas volume entering via the through holes in the check valve. This is important because the through holes enable gas to enter the chamber even if the filter becomes clogged and flow through the breather check valve ceases.

Clogging of the filter can occur in a contaminated, dusty environment such as a mine site. The container may be used as a fuel tank for fuelling an engine which is used to drive equipment of certain types. If the filter becomes clogged a vacuum can be created in the container which can cause fuel starvation to the equipment's engine putting the equipment in an unsafe situation. The through holes in the check valve allow a bypass of non filtered gas to enter the container thereby enabling fuel to continue to be consumed. This provides for a very effective safety feature. In certain embodiments the gas volume available through the through holes is about 3% of the total value of gas which can be delivered via the breather check valve.

In a fourth aspect, embodiments are disclosed of a check valve for use in a valve assembly, the check valve including a sealing member movable between a check valve open position, and a check valve closed position, the sealing member having one or more through hole(s) therein, the check valve when in the check valve open position providing for a main flow route for fluid leaving the valve assembly, the through hole(s) in the sealing member providing for a limited return flow route for gas returning to the valve assembly when the check valve is in the check valve closed position.

As well as the embodiments discussed in the summary, other embodiments are disclosed in the specification, drawings and claims. The summary is not meant to cover each and every embodiment, combination or variations contemplated with the present disclosure.

BRIEF DESCRIPTION OF THE DRAWINGS

These and other features, aspects, and advantages of the present disclosure will become better understood with regard to the following description, appended claims, and accompanying figures where

DETAILED DESCRIPTION

The present disclosure will now be described in detail with reference to one or more embodiments, examples of which are illustrated in the accompanying drawings. The examples and embodiments are provided by way of explanation and are not to be taken as limiting the scope of the disclosure. Furthermore, features illustrated or described as part of one embodiment may be used by themselves to provide other embodiments and features illustrated or described as part of one embodiment may be used with one or more other embodiments to provide a further embodiments. It will be understood that the present disclosure will cover these variations and embodiments as well as other variations and/or modifications.

It will be understood that the term "comprise" and any of its derivatives (e.g., comprises, comprising) as used in this specification is to be taken to be inclusive of features to which it refers, and is not meant to exclude the presence of any additional features unless otherwise stated or implied.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included only for the ease of reference of the reader and should not be used to limit the subject matter found throughout the disclosure or the claims. The subject headings should not be used in construing the scope of the claims or the claim limitations.

Figure 1:
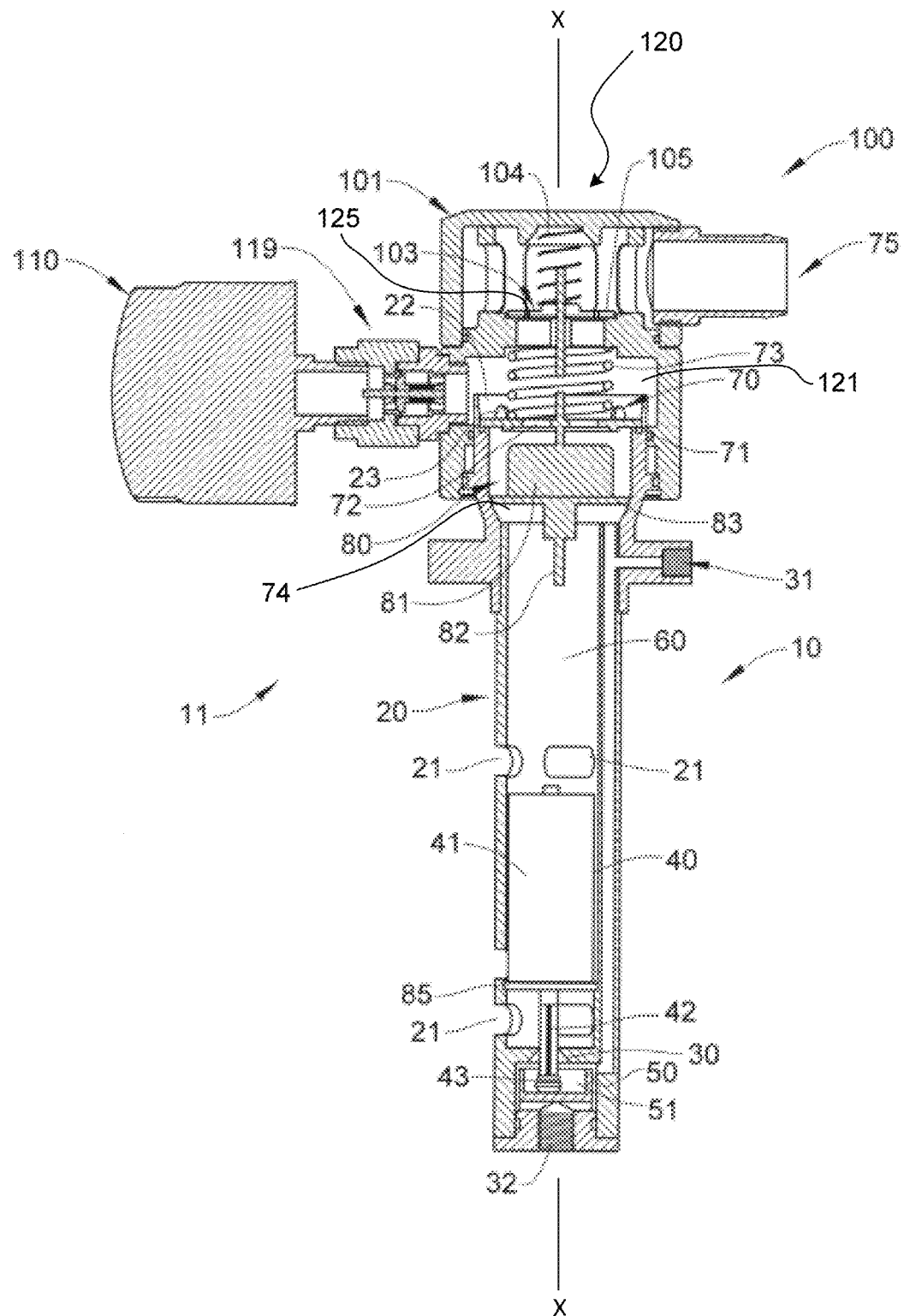
FIG. 1 is a section side view of a valve apparatus, according to certain embodiments of the present disclosure.

FIG. 1 shows a float valve apparatus 11 including an upper portion being a valve assembly 100 and a lower portion being a float valve 10, according to certain embodiments. The float valve apparatus 11 may be attached to a liquid container such as a fuel tank 1, depicted in FIG. 10. In certain applications, the float valve may be directly and/or indirectly attached to the liquid container. For example, in certain applications, the float valve assembly may be attached to a hose that is attached to the container. In this instance (not shown in the Figures), the float valve apparatus 11 is indirectly attached to the container. In certain applications, the float valve may be attached to the container via some intermediary structure such as an adaptor and so forth. The valve assembly 100 may be attached to, retrofitted to, and/or used in conjunction with the float valve 10. The valve assembly may also be attached to, retrofitted to, and/or used in conjunction with other valves or structures that are suitable for monitoring liquid levels in containers. The valve assembly 100 is depicted in herein as being used with a particular fast fill system and a particular float valve 10, however, it is to be understood this is for illustration purposes and is not limiting as to the applicability of the valve assembly to other suitable fast fill systems, other suitable applications and/or other suitable float valves.

Figure 2:
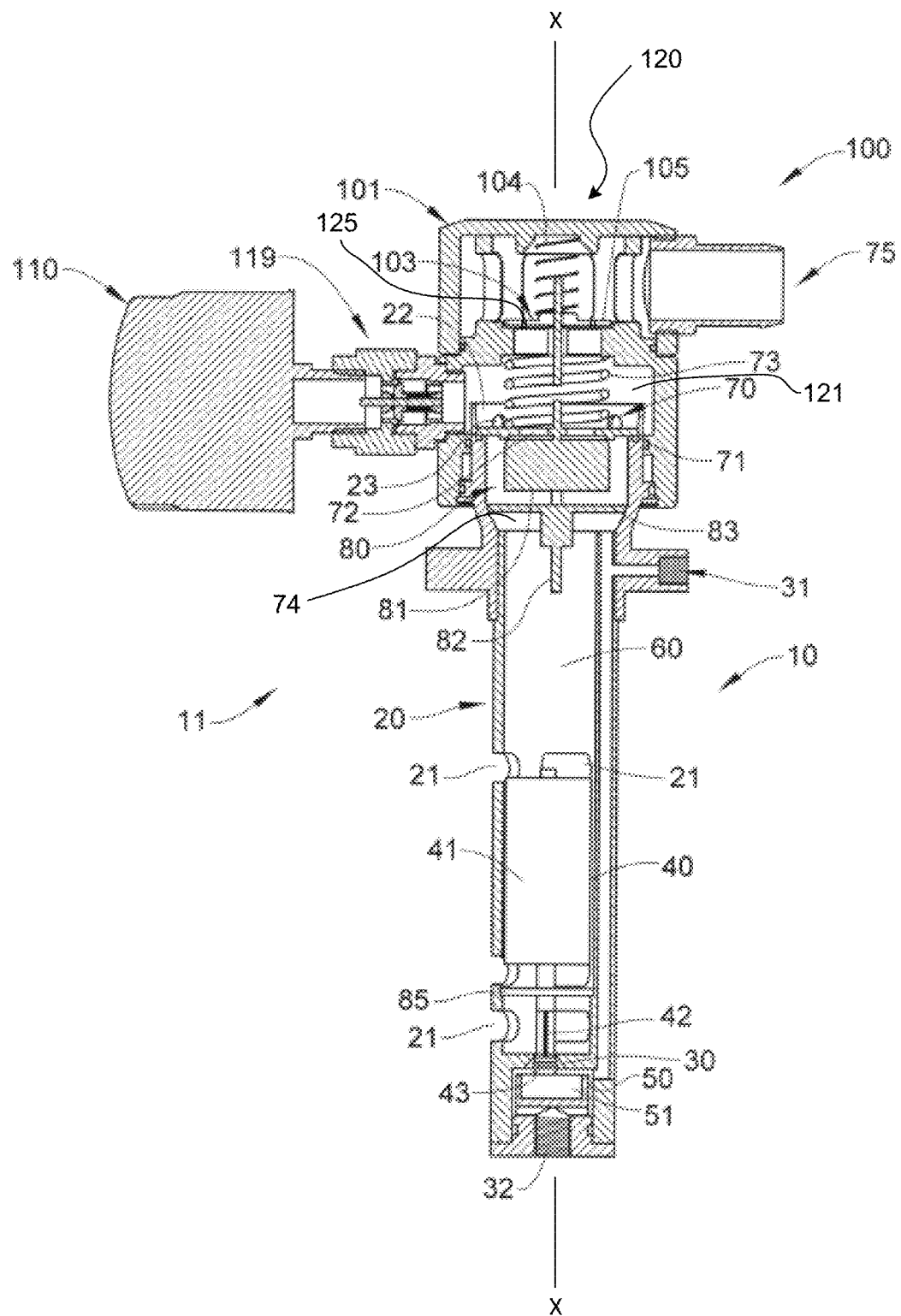
FIG. 2 is a further section side view of the valve apparatus of FIG. 1 with a breather float valve in a closed position.
Figure 3:
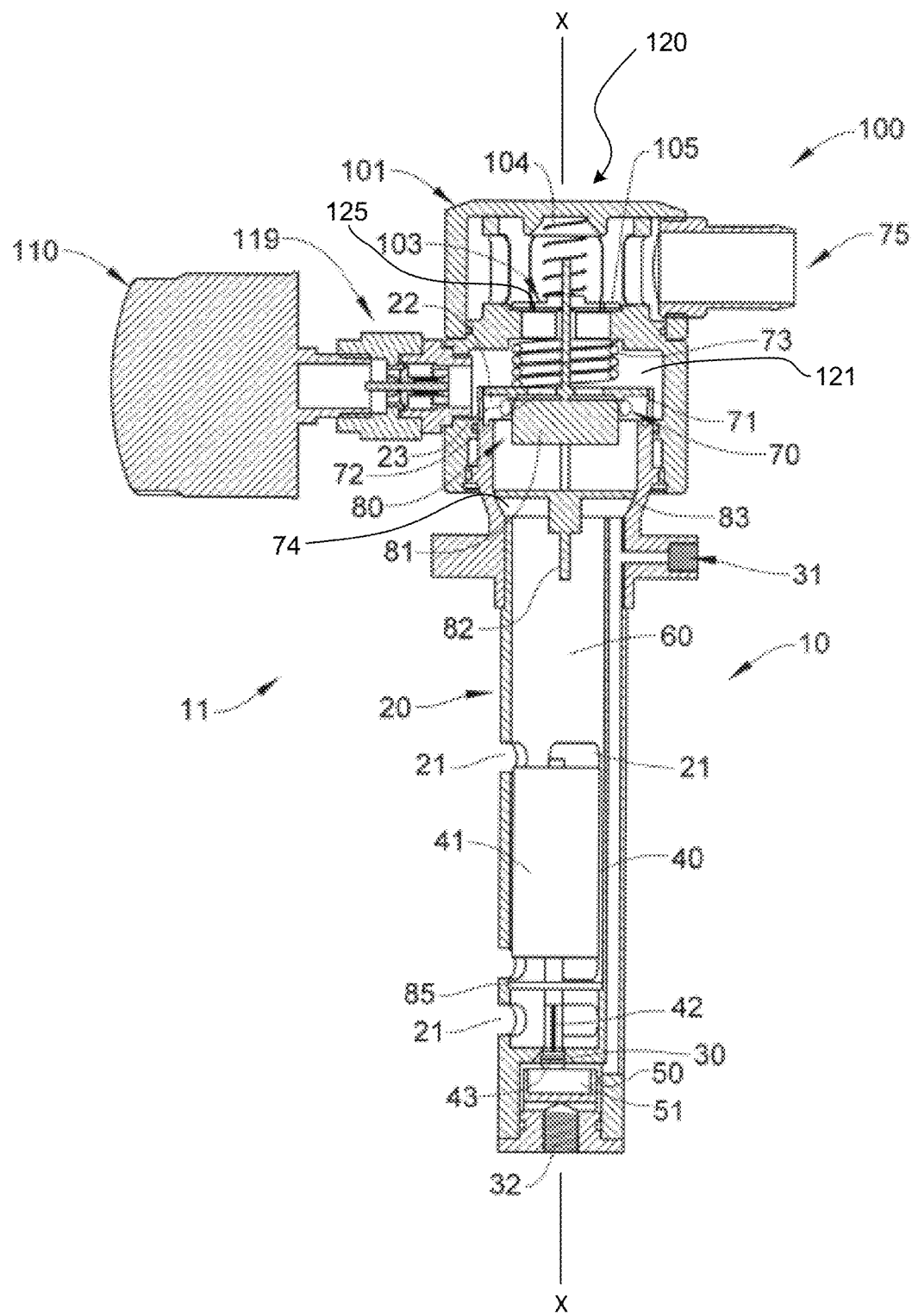
FIG. 3 is a further section side view of the valve apparatus of FIG. 1 with a relief valve in an open position.
Figure 10:
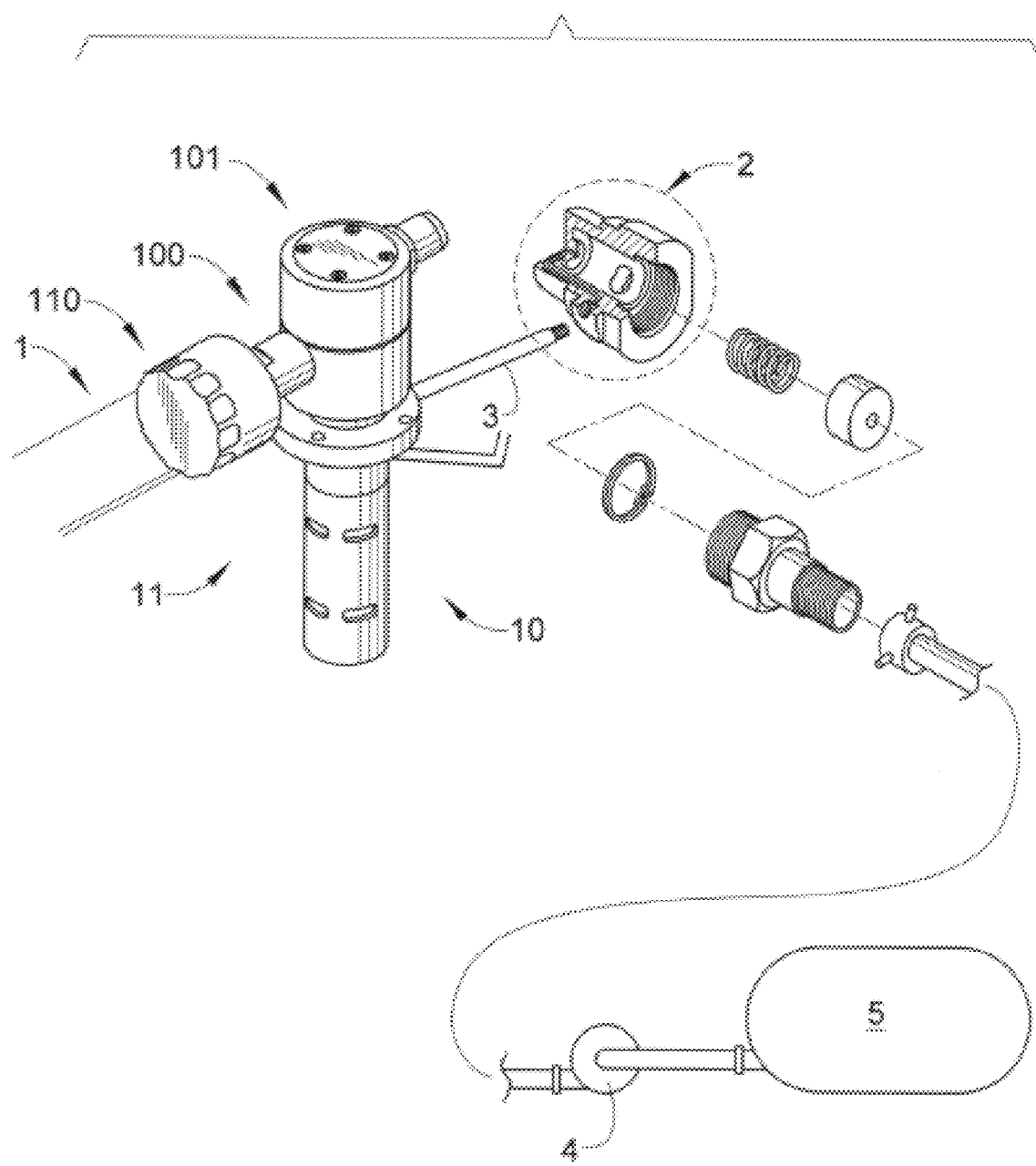
FIG. 10 is a schematic representation of the valve apparatus according to an embodiment of the present disclosure, and an associated control valve.

The float valve apparatus 11 shown in FIGS. 1, 2 and 3 may be used with a control valve (such as the control valve 2 illustrated in FIG. 10, to prevent liquid from entering the liquid tank when the level of the liquid in the liquid tank has reached a predetermined level. FIG. 10 shows the float valve apparatus 11 (made up of the valve assembly 100 and the float valve 10) connected to the control valve 2 via a bleed line 3, according to certain embodiments. The control valve 2 may be connected to a liquid pump 4 and supply tank 5 also schematically shown in FIG. 10.

With respect to application areas, certain of the disclosed embodiments may be used in applications where liquid is being added to a container. Certain embodiments are directed to fast filling systems where it is desirable to add liquids to a container in a fast and/or safe manner. The equipment may be stationary or moving or a combinations thereof. One example of this is fast filling of fuel to large pieces of stationary and/or moving equipment that are used in the oil and gas, mining and/or related industries, such as diggers, haul trucks and graders. Another example would be to add fuel to locomotives used in the transport industry. Another example would be to add fuel to trucks used in the hauling and/or transport industry. In certain applications, the size of the containers to be filled may vary from 50 gallons up to 10,000 gallons. In certain applications, the container to be filled may be between 400 gallons to 6000 gallons, 600 gallons to 1000 gallons or 1000 gallons to 4000 gallons. Other sized containers may also be filled using certain disclosed embodiments.

In certain disclosed embodiments, the term 'fast filling' and/or 'fast fuelling' may mean a filling rate of between 25 gallons per minute to 1000 gallons per minute, 50 gallons per minute to 125 gallons per minute, 80 gallons per minute to 140 gallons per minute, 75 gallons per minute to 125 gallons per minute, 100 gallons per minute to 200 gallons per minute, 125 gallons per minute to 225 gallons per minute, 150 gallons per minute to 280 gallons per minute 200 gallons per minute to 600 gallons per minute, 200 gallons per minute to 400 gallons per minute or 300 gallons per minute to 800 gallons per minute.

In certain disclosed embodiments, the term fast filling and/or fast fuelling may mean a filling rate of at least 25 gallons per minute, 50 gallons per minute, 75 gallons per minute, 100 gallons per minute, 125 gallons per minute, 140 gallons per minute, 160 gallons per minute, 180 gallons per minute, 200 gallons per minute, 225 gallons per minute 250 gallons per minute 275 gallons per minute, 300 gallons per minute, 400 gallons per minute, 500 gallons per minute, 600 gallons per minute or 800 gallons per minute.

In certain embodiments, the float valve 10 comprises a housing 20 that is hollow and substantially cylindrical in shape. Other suitable shapes to the housing are also contemplated. The housing 20 has several holes 21 located along its length that allow liquid located within the liquid tank to pass in and out of the housing 20.

An inlet 30 is provided at a lower end of the housing 20 through which passes liquid. The inlet 30 is fluidly connected to two separate screw threaded apertures 31 and 32. The bleed line 3 is connected to one of the apertures 31 or 32. In certain embodiments, the bleed line is fluidly connected to the flow control valve to activate the flow control valve. The screw-threaded apertures 31 and 32 allow the bleed line to be connected outside or inside of the liquid tank. The communication between the flow control valve and the float valve 11 may also be achieved using other mechanical, electrical approaches or combinations thereof.

As shown in FIGS. 1, 2 and 3, an inlet float valve 40 is housed in a lower end of the housing 20. The inlet float valve 40 is formed from an inlet float 41 and stem 42. A valve seal 43 is located adjacent the end of the stem 42 for sealing the inlet 30.

The inlet float valve 40 is mounted within the housing so that the stem 42 can reciprocate between an open position, in which liquid is able to pass through the bleed line 3 and through the inlet 30 into the liquid tank 1, and a closed position that prevents the flow of liquid through the inlet.

A liquid chamber 50 is located between the inlet 30 and the apertures 31 and 32. The liquid chamber 50 provides a shelter 51 in which an end of the stem 42 is located when the inlet float valve 40 is in the open position.

Figure 4:
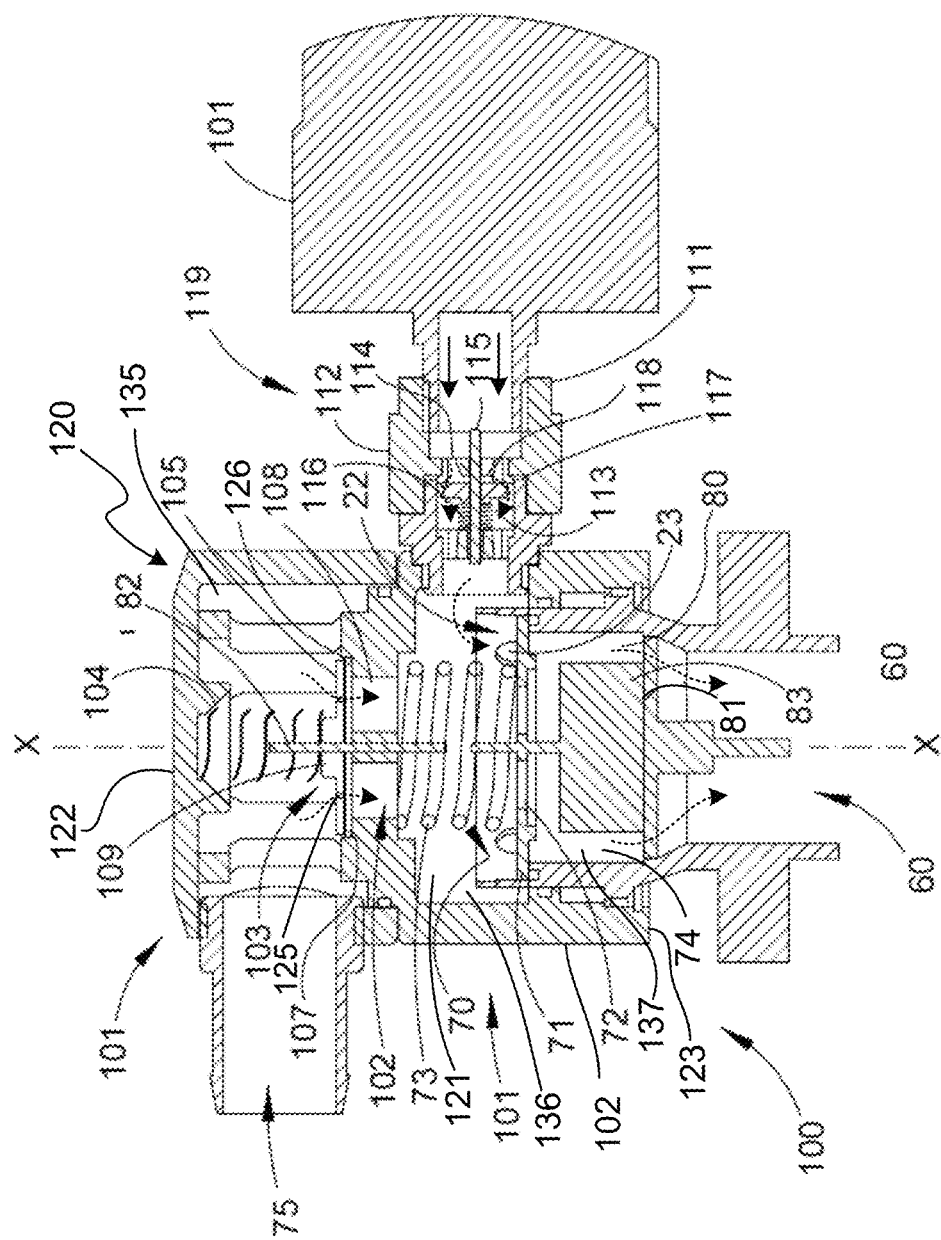
FIG. 4 is a sectional side view of a valve apparatus in one operating position, in which a check valve is closed and a breather check valve is open, according to certain embodiments of the present disclosure.
Figure 5:
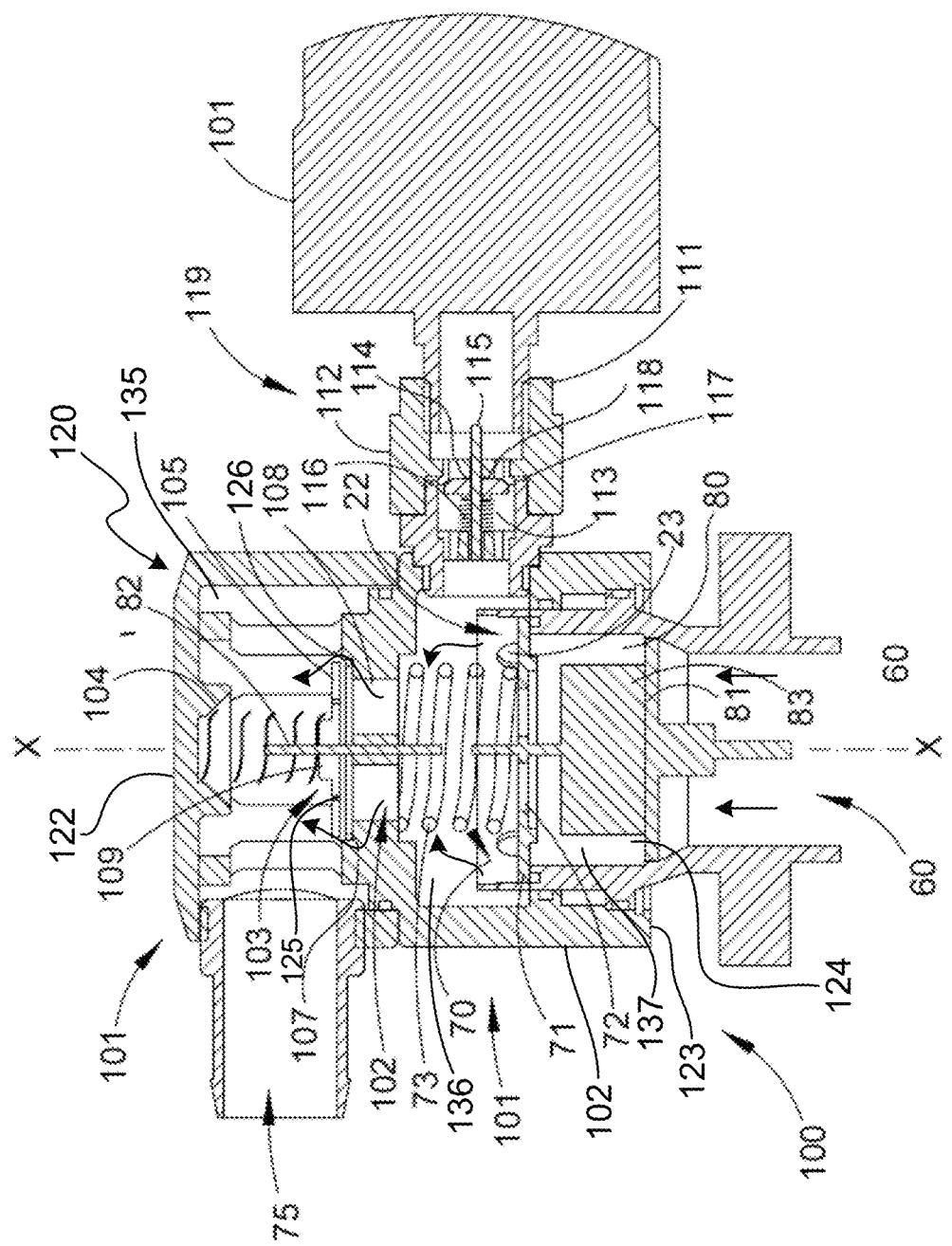
FIG. 5 is a sectional side view of the valve apparatus in FIG. 4 in another operating position in which the check valve is open.

Referring to the drawings and in particular to FIGS. 4 and 5, the valve assembly 100 comprises a housing 120 having an internal chamber 121 therein. In use, the housing 120 is disposed in an upright orientation and has a top 122 and a bottom 123 with a generally main axis X-X extending in a direction from the top to the bottom. The housing 120 may be mounted to the fuel tank externally thereof. The housing 120 includes an upper or top cap section 101 and a lower section or housing body 102. An outlet 75 is provided in the region of the top 122 of the housing 120, and an inlet 124 in the region of the bottom. Passageway 60 extends through the internal chamber 121 of the housing 120 and provides for an exhaust route through the internal chamber 121 of the valve assembly 100 from inlet at the bottom 123 to the outlet 75 at the top 122. The housing 120 further includes an internal section 102 which has an interior seating portion or valve seat 107 thereon and a housing ridge 108.

FIGS. 4 and 5 further illustrates additional details of the valve assembly, according to certain embodiments. In this exemplary embodiment, the valve assembly 100 of the float valve apparatus 11 includes a check valve 103, a relief valve 70, a breather float valve 80 and a breather check valve assembly 119. The check valve 103, relief valve 70 and breather float valve 80 are disposed within the internal chamber 121 of the housing 120. As shown in FIG. 4, the check valve 103, relief valve 70 and breather float valve 80 are arranged one above the other with the breather float valve 80 closest to the bottom 123 and the check valve closest to the top 122 of the housing 120. The breather float valve 80 and check valve 103 are movable between open and closed positions. In each case, when in the open positions the valves 80 and 103 provide an open passage along passageway 60 and in the closed position, close the passageway 60. The check valve 103 may include a light weight spring 104 (i.e. force transferring member) and a sealing member 105. Other force transferring member structures or mechanisms may also be used. The sealing member 105 comprises a disc shaped plug or poppet disc 106. The valve further includes a shaft or stem 88 a portion of which at least in part extends through and a central portion of a poppet disc 106. This will be described in more detail later in the specification. The poppet disc 106 is merely illustrative of one structure of a sealing member that may be used. Other sealing member structures or mechanisms may also be used.

Figure 6:
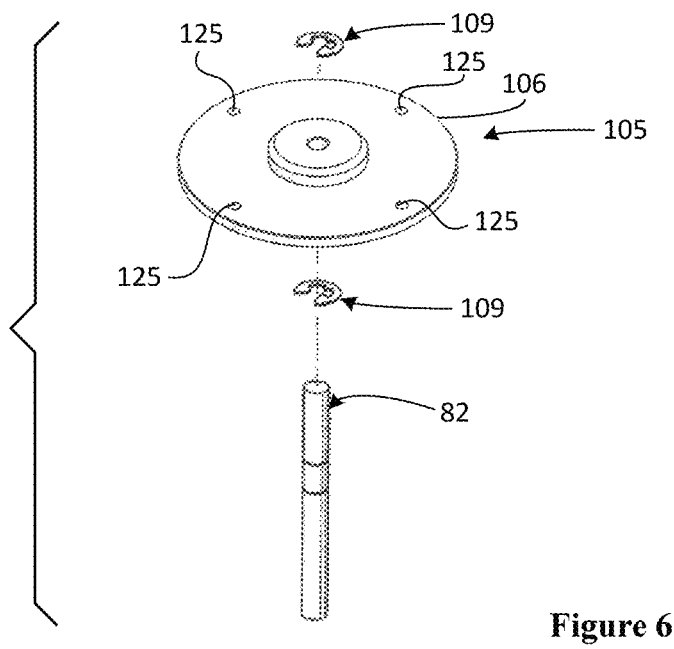
FIG. 6 is an exploded view of a part of the check valve of FIG. 4.
Figure 7:
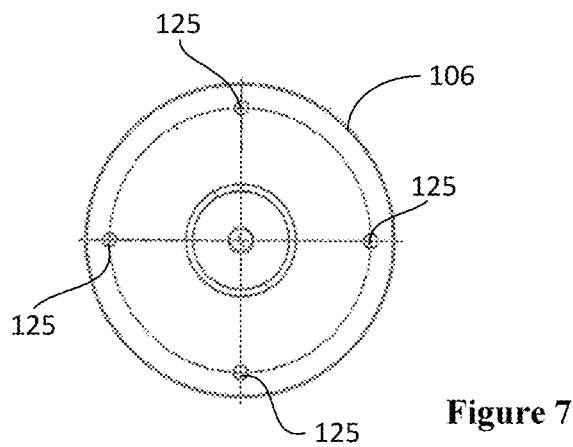
FIG. 7 is a plan view of a part of the check valve of FIG. 6.
Figure 8:
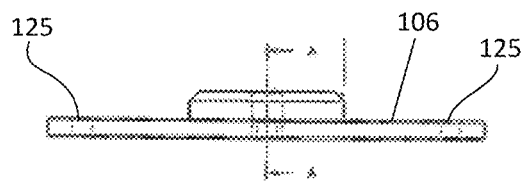
FIG. 8 is a side elevation of the part illustrated in FIG. 7.
Figure 9:
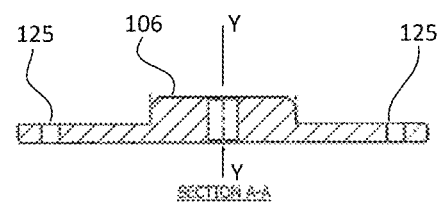
FIG. 9 is a sectional view of the part illustrated in FIGS. 7 and 8, taken along the line A-A on FIG. 8.

As shown in the drawings, the poppet disc 106 has a plurality of through holes 125 therein. One or more through holes may be provided and, as shown in FIGS. 6 to 9, there are four holes which are arranged in spaced relation and radially spaced from central axis Y-Y. The arrangement in such that under certain operating conditions, the through holes 125 provide a route for the return of some gas through the check valve 103 from the outlet 75. The poppet disc 106 sits, in its closed position, on an o-ring 126 forming a valve seat 107. As shown in FIG. 6, the poppet disc 106 is attached to the shaft 82 with two circlips 109. Other ways of attaching the poppet disc to the shaft may also be used in other embodiments. The o-ring 126 is seated on an interior seating portion or valve seat 107 of the valve assembly housing 120. When the container is not being filled and the check valve 103 is in a closed position, the poppet disc 106 is held against the o-ring 126 by the light weight spring 104. This closed position substantially prevents a relatively large volume of exhaust from venting out of the container via check valve 103. The closed position of the check valve 103 also substantially prevents a relatively large volume of unfiltered gas and/or unwanted particles from entering the valve assembly and ending up in the valve assembly and/or in the liquid container. One of the functions and advantages of the check valve 103 is to substantially prevent relatively large volume, but not all, unfiltered gas and/or unwanted particles from being drawn back into the valve assembly and/or the liquid container via the check valve 103. These liquid containers, for example a fuel tank, are often mounted on equipment (stationary or moving) that may be operating in a dirty or dusty environment where unfiltered gas and/or unwanted particles may enter the valve assembly and/or liquid container and cause one or more of the following problems: contaminate the liquid in the container, impede the proper operation of the valve assembly, impede the proper operation of other components of the fast fill system, and impede the proper operation of the equipment associated with the liquid container. For example, if unwanted particles or fluids get into the engine of the equipment associated with the liquid container this may cause deterioration in the performance of the engine and/or result in more frequent maintenance on the engine. When the liquid container is being filled with fluid (for instance, fuel) the gas being displaced from the container will urge the poppet disc 106 upwards overcoming the downward pressure of the light weight spring 104, thus allowing the displaced gas to vent from the container and the valve assembly via the outlet 75. This is shown in FIG. 5 by the gas flow lines depicted in black lines with an arrow indicating flow direction. The ratio of the cross-sectional area of the poppet disc or the cross-sectional area of a passageway which the poppet disc can close to the total cross-sectional area of the through holes is in the range 4:1 to 7:1 and more preferably about 5.6:1. In one embodiment the poppet disc has a diameter of about 45 mm and includes four through holes each having a diameter of about 2 mm.

Also illustrated in FIGS. 4 and 5 is a breather check valve assembly 119, according to certain embodiments. In this exemplary embodiment, the housing of the breather check valve assembly is comprised of a top portion 111 and a body portion 112. A breather check valve 113 is substantially enclosed within the housing. This may also be referred to as a breather poppet valve, in certain embodiments. The top portion 111 is configured such that a filter 110 may be attached to the top portion 111 of the breather check valve housing. In certain applications the filter may be in gas communication with the breather check valve assembly but not directly connected to it. This filter may be an air filter, other filters suitable for a particular application, other devices suitable for a particular application or combinations thereof. In certain applications, the filter may be directly connected and/or indirectly connected to the breather check valve assembly. For example, a hose may be used to connect the filter to the breather check valve assembly. Such an arrangement may permit the filter to be spaced apart from the breather check valve assembly. In addition, in certain applications at least two filters may be used, for example in series.

The body portion 112 of the breather check valve housing is configured so that it may be attached to the other portion of the valve assembly. In this exemplary embodiment, the breather check valve (also referred to, in certain embodiments, as a breather poppet) includes a breather check valve sealing member (here a plate like structure) 114, a breather rod 115, a breather check valve force transferring member (here a spring) 116 and a breather o-ring 117. The breather o-ring 117 is seated on an interior seating portion 118 of the top portion 111 of the housing. When the container is being filled, the breather check valve 119 is held in a closed position. The breather sealing member 114 is held against the o-ring 116 by a force transferring member 117, as illustrated in FIG. 4. During filling of the liquid container this closed position substantially prevents exhaust, liquid, foam and/or unwanted particles from reaching the filter 110 via the breather check valve 113, thus, limiting the damage to and/or shorting the life of the filter due to exhaust, liquid, foam and/or unwanted particles reaching the filter. For example, when a fuel tank is being filled with fuel, the exhaust existing via the valve assembly may contain unwanted components and/or unwanted particles that may damage the filter and/or reduce its life.

During fuelling, foam and/or surges of the fuel may also occur and it is desirable to prevent such foam and/or fuel from entering the filter. Another advantage of the breather check valve is that it prevents and/or reduces liquid surges in the container from reaching the filter because the breather check valve is in a closed position (or substantially closed position) in such situations. For example, if a fuel tank experiences a fuel surge due to movement of the heavy equipment during use, then the fuel will be prevented from reaching the air filter due to the closed position of breather check valve.

When the liquid (for example, fuel) is being emptied and/or consumed from the liquid container, the difference in pressure created by the displaced liquid being consumed creates a sufficient pressure difference between the spring side of the plate and the filter side of the plate such that the plate 114 is urged away from the o-ring 117 along shaft 115 and overcoming the pressure of the spring 116, thus allowing gas (for example, air) that has been filtered by the filter 110 to enter the container via the breather check valve. A small proportion of gas enters the internal chamber via the through holes 125 in the check valve 103. As shown in FIG. 4, when the breather check valve is open, the gas flow lines depicted in dashed lines with an arrow indicating flow direction, illustrate how gas is returned from externally of the container through the breather check valve 113 and check valve 103 and into the chamber 121 and then the container.

Also shown in FIGS. 1 to 5 is a breather float valve 80 that is adjacent the breather holes 72. The breather float valve 80 is formed from a breather float 81 and a rod 82. A platform 83 and the relief plate 71 guide rod 82. The breather float 81 is able to reciprocate along a portion of the length of the rod 82 between the relief plate 71 and the platform 83. The guide rod 82 is fixed to the breather float 81 with circlips. Other ways of fixing the rod to the float may also be used.

The breather float valve 80 is in an open position when the breather float 81 is located adjacent the platform 83 and gas is free to pass through the breather holes 72. The breather float valve 80 is in a closed position when the breather float 81 is located over the breather holes 72 and liquid cannot pass through the breather holes 72 or is substantially reduced as to the amount of liquid that can pass through the breather holes 72, as illustrated in FIG. 3.

A relief valve 70 is also provided within top cap housing 101, as part of the valve assembly. The relief valve 70 is formed from the relief plate 71, a spring 73 and a portion of the body 102 of the valve assembly 100. The relief plate is able to move within a skirt 22. The skirt 22 has a number of circumferentially spaced relief holes 23. The spring 73 holds the relief plate at the base of the skirt 22. The spring 73 is held in position between relief plate 71 and a portion of the body of the breather assembly 102. The top portion of the spring is prevented from moving further towards the check valve 103 by a housing ridge 108.

As shown in FIGS. 1 to 5, in this exemplary embodiment, a portion of the housing 20 of the float valve 11 is open so that a passageway 60 is provided between the inside and outside of the liquid tank. This allows gas to pass from within the liquid tank to the atmosphere via the outlet 75 of the valve assembly 100 so that the liquid tank does not rupture or over-pressurise during filling of the liquid tank. During filling of the liquid container, an exhaust route is provide through the valve assembly 100. Relief plate 71 is positioned within the top cap housing 101. Breather holes 72 are located within the relief plate 71. The breather holes 72 form part of the exhaust route. In addition, during filling of the liquid container a check valve 103 is moved to an open position due to the pressure from the air seeking to escape from the liquid container as the container is filled (see also FIG. 4). The air pressure from the container results in a force being applied to the sealing member 105 of the check valve and then to the force transferring member 104 of the check valve moving the check valve to an open position. Once the check valve 103 is opened air may be exhausted from the float valve assembly via the exhaust port 75. In certain embodiments, the cylinder housing does not have to extend up to the valve assembly housing but may be connected by at least one pipe, hosing and/or other suitable structures. The cylindrical housing may be in direct and/or indirect fluid communication with the valve assembly.

As best illustrated in FIGS. 4 and 5, the check valve 103, relief valve 70 and breather float valve 80 are arranged one on top of the other in substantial alignment. The shaft 82 which forms part of the check valve 103 and the guide rod 82 which forms part of the breather float valve 80 have longitudinal axes which are substantially axially aligned. The check valve 103 and relief valve 70 are configured so as to separate the interior 121 of the housing 120 into three zones 135, 136 and 137. Zone 135 is an upper zone between the check valve 103 and the outlet 75, zone 136 is an intermediate zone between the check valve 103 and the relief valve 70 and zone 137 is below the relief valve and contains the float 81 of the breather float valve 80. As shown the breather float valve assembly 119 is configured for fluid communication with the intermediate zone 136.

In use, the float valve 11 has a number of functions. In operation, the inlet float valve 40 is in the open position such that the stem 42 sits within the shelter 51 as shown in FIG. 1. The bleed line 3 passes liquid in to the liquid chamber 50. The liquid then passes through the inlet 30, into the housing 20 and out the liquid holes 21 into the liquid tank. Turbulence that is created by the liquid passing through the liquid chamber 50 does not affect the valve seal 43 as it is located within the shelter 51 or the impact of turbulence from liquid and/or air is reduced or substantially reduced due to the locations of the valve seal 43 in relationship to the shelter 51.

As the liquid tank fills with liquid, the passageway 60 of the housing 20 also fills with liquid to a similar level. The inlet float 41 rises within the housing until the valve seal 43 blocks the inlet 30 as shown in FIG. 2. The pressure of the liquid within the bleed line, as well as the liquid within the tank acting on the float, maintains the valve seal 43 in position within the inlet 30. Once the inlet 30 is blocked, the bleed line 3 fills with liquid causing the flow control valve 2 to become closed and prevents further filling of the liquid tank or substantially prevents further filling of the liquid tank.

When the vehicle is moving, the housing 20 prevents damage of the inlet float valve 40 or substantially reduces damages to the inlet float valve 40. The impact forces created by surging liquid within the liquid tank impact the housing 20, not the inlet float valve 40.

However, the surging liquid can still extend up passageway 60 and up to the breather holes 72. The breather float valve 80 prevents this surging liquid from escaping through the breather holes 72 as the breather float 81 moves with the surging liquid blocking the breather holes 72 as shown in FIG. 2.

The breather float valve 80 also provides a failsafe during filling of the liquid tank. If the bleed line 3 is severed or the control valve fails or the inlet float valve fails, then a liquid supply nozzle (not shown) will continue to pump liquid into the liquid tank. The liquid tank will fill with liquid until the breather float 81 moves to the closed position to block the breather holes 72. The continued filling of the liquid tank creates pressure within the liquid tank. When the liquid tank reaches a liquid nozzle shut off pressure, then the liquid supply nozzle will shut-off stopping the liquid tank from rupturing.

However, if the liquid supply nozzle does not shut off automatically due to a mechanical fault, then the liquid supply nozzle will continue to supply liquid to the liquid tank via the flow control valve. This causes the pressure within the liquid tank to increase. At a pressure less than the rupture pressure of the tank, the pressure relief valve is opened as shown in FIG. 3. This occurs when the liquid tank pressure becomes greater than the spring pressure causing the relief plate 71 to move upwardly until it passes over the relief holes 23 in the skirt 22. Liquid then passes from the tank, through the relief holes 23, into the interior of the top cap housing 101 and through outlet 75. The liquid flowing from the top cap housing 101 will typically indicate to an operator to shut the liquid supply nozzle off manually or take other corrective actions.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. It should be appreciated that various other changes and modifications may be made to the embodiment described without departing from the spirit or scope of the inventions disclosed herein.

TABLE OF PARTS

| Part | Number |
|---|---|
| Valve apparatus (valve apparatus) | 11 |
| Fuel tank (FIGS. 6, 13A, 13B, 14, 15) | 1 |
| Control valve | 2 |
| Bleed line | 3 |
| Pump | 4 |
| Supply tank | 5 |
| Float | 10 |
| Housing (cylindrical) | 20 |
| Holes | 21 |
| Inlet | 30 |
| Threaded apertures | 31/32 |
| Inlet float valve | 40 |
| Inlet float | 41 |
| Stem | 42 |
| Valve seal | 43 |
| Liquid chamber | 50 |
| Shelter | 51 |
| Passageway (exhaust route) | 60 |
| Valve assembly | 100 |
| Outlet | 75 |
| Relief plate | 71 |
| Top cap housing | 101 |
| Breather holes (part of exhaust route) | 72 |
| Check valve | 103 |
| Sealing member | 105 |
| Disc-shaped plug, or Poppet Disc | 106 |
| Force transferring member (spring) | 104 |
| Shaft | 82 |
| O-ring (closes disc 105) (FIG. 4) | 126 |
| Circlips | 109 |
| Valve seat | 107 |
| Valve assembly housing (top cap housing) | 101 |
| Breather check valve assembly | 119 |
| Top portion (housing part) | 111 |
| Body portion (housing part) | 112 |
| Breather check valve (breathe poppet) | 113 |
| Filter | 110 |
| Breather check valve sealing member (plate like structure) | 114 |
| Breather rod | 115 |
| Breather check valve force transmitting member (spring) | 116 |
| Breather O-ring | 117 |
| Interior seating portion | 118 |
| Breather float valve | 80 |
| Breather float | 81 |
| Rod | 82 |
| Platform | 83 |
| Relief valve | 70 |
| Relief plate | 71 |
| Spring | 73 |
| Portion of body of breather assembly | 102 |
| Housing ridge | 108 |
| Skirt | 22 |
| Relief holes | 23 |
| Housing | 120 |
| Interior chamber | 121 |
| Top | 122 |
| Inlet | 74 |
| Outlet | 75 |
| Bottom | 123 |
| Through holes | 125 |
| Central axis | Y-Y |
| Compartments | 135, 136, 137 |

The invention claimed is:

1. A valve assembly for use with a container for holding a fluid comprising a liquid and a gas, the valve assembly comprising:
a housing having an internal chamber therein and an inlet and an outlet to and from the internal chamber, the internal chamber in use being in fluid communication with the container and providing for an exhaust route for fluid from the container to the outlet;
(ii) a check valve including a sealing member movable between a check valve open position, and a check valve closed position, the sealing member having one or more through holes therein, the check valve when in the check valve open position providing for a main flow route for fluid leaving the internal chamber via the outlet, the one or more through holes in the sealing member providing for a limited return flow route for gas returning to the internal chamber via the outlet when the check valve is in the check valve closed position for continuous equalization of pressure in the internal chamber, wherein the through holes are continuously fluidically conductive for continuous equalization of pressure in the internal chamber when the check valve is in the check valve open position and also when the check valve is in the check valve closed position; and,
(iii) a breather check valve movable between a breather valve open position in which it provides fluid communication between the exhaust route and externally of the housing, and a breather valve closed position, and a filter which is in gas communication with the breather check valve for filtering gas before the gas enters the internal chamber and container.

2. The valve assembly according to claim 1, wherein the check valve is disposed within the internal chamber.

3. The valve assembly according to claim 1, wherein the check valve comprises a poppet valve, the sealing member including a disc-shaped plug or poppet disc having a central axis, the through hole(s) extending through the poppet disc from one side to the other side thereof, the poppet valve further including a shaft or stem operatively connected to the poppet disc, the poppet disc being adapted to seat against a valve seat when the check valve is in the check valve closed position, the poppet disc being displaced from the valve seat when the check valve is in the check valve open position.

4. The valve assembly according to claim 3, wherein the check valve further includes a valve force transferring member which urges the check valve into the check valve closed position.

5. The valve assembly according to claim 4, wherein the valve force transferring member comprises a spring.

6. The valve assembly according to claim 5, wherein there is provided a plurality of said through holes which are radially spaced from the central axis and spaced apart from one another around the poppet disc.

7. The valve assembly according to claim 6, wherein four through holes are provided.

8. The valve assembly according to claim 1, further including:
(iv) a relief valve disposed within the housing and including a relief plate movable between a relief valve closed position to a relief valve open position, the relief plate having at least one breather hole therein which forms part of the exhaust route;
(v) a breather float valve disposed within the housing adjacent to and upstream of the relief valve with respect to the fluid flow direction towards the outlet, the breather float valve including a breather float configured for movement between a breather float open position in which position flow can be effected through the one or more breather holes and a breather float closed position in which the breather float moves in a direction towards the relief plate so as to close the one or more breather holes.

9. The valve assembly according to claim 8, the check valve is downstream of the relief valve and the breather float valve with respect to the fluid flow direction towards the outlet.

10. The valve assembly according to claim 1, wherein the housing comprises a top and a bottom end, the outlet being in the region of the top end and the inlet being in the region of the bottom end.

11. The valve assembly according to claim 10, wherein the housing comprises a main axis extending in a direction from the top end to the bottom end, and said check valve, relief valve and breather float valve are arranged to move between their open and closed positions in the axial direction X-X.

12. The valve assembly according to claim 11, wherein the check valve, relief valve and breather float valve are generally axially aligned with the main axis X-X.

13. The valve assembly according to claim 1, wherein the valve assembly is an aspect of a valve apparatus for use with a container for holding a fluid comprising a liquid and a gas, wherein the valve apparatus further comprises:
an inlet float valve which includes an inlet float valve housing having a passageway therein which is in fluid communication with the exhaust route in the valve assembly housing,
the inlet float valve further including an inlet float movable between an open position and a closed position in which position the passageway is closed.

14. A system for use in the control of fluid flow to and from a container, the system comprising:
a valve apparatus comprising:
a valve assembly comprising:
a housing having an internal chamber therein and an inlet and an outlet to and from the internal chamber, the internal chamber in use being in fluid communication with the container and providing for an exhaust route for fluid from the container to the outlet;
(ii) a check valve including a sealing member movable between a check valve open position, and a check valve closed position, the sealing member having one or more through holes therein, the check valve when in the check valve open position providing for a main flow route for fluid leaving the internal chamber via the outlet, the one or more through holes in the sealing member providing for a limited return flow route for gas returning to the internal chamber via the outlet when the check valve is in the check valve closed position for continuous equalization of pressure in the internal chamber, wherein the through holes are continuously fluidically conductive for continuous equalization of pressure in the internal chamber when the check valve is in the check valve open position and also when the check valve is in the check valve closed position; and,
(iii) a breather check valve movable between a breather valve open position in which it provides fluid communication between the exhaust route and externally of the housing, and a breather valve closed position, and a filter which is in gas communication with the breather check valve for filtering gas before the gas enters the internal chamber and container;
an inlet float valve which includes an inlet float valve housing having a passageway therein which is in fluid communication with the exhaust route in the valve assembly housing,
the inlet float valve further including an inlet float movable between an open position and a closed position in which position the passageway is closed;
a control valve; and
a bleed line, the inlet float valve being operatively connected to the control valve via the bleed line.

15. The system according to claim 14, wherein the check valve comprises a poppet valve, the sealing member including a disc-shaped plug or poppet disc having a central axis, the through hole(s) extending through the poppet disc from one side to the other side thereof, the poppet valve further including a shaft or stem operatively connected to the poppet disc, the poppet disc being adapted to seat against a valve seat when the check valve is in the check valve closed position, the poppet disc being displaced from the valve seat when the check valve is in the check valve open position.

16. The system according to claim 15,
wherein the check valve further includes a valve force transferring member which urges the check valve into the check valve closed position,
wherein the valve force transferring member comprises a spring, and
wherein there is provided a plurality of said through holes which are radially spaced from the central axis and spaced apart from one another around the poppet disc.

17. The system according to claim 14, further including:
(iv) a relief valve disposed within the housing and including a relief plate movable between a relief valve closed position to a relief valve open position, the relief plate having at least one breather hole therein which forms part of the exhaust route;
(v) a breather float valve disposed within the housing adjacent to and upstream of the relief valve with respect to the fluid flow direction towards the outlet, the breather float valve including a breather float configured for movement between a breather float open position in which position flow can be effected through the one or more breather holes and a breather float closed position in which the breather float moves in a direction towards the relief plate so as to close the one or more breather holes.

18. The system according to claim 14,
wherein the housing comprises a top and a bottom end, the outlet being in the region of the top end and the inlet being in the region of the bottom end,
wherein the housing comprises a main axis extending in a direction from the top end to the bottom end, and said check valve, relief valve and breather float valve are arranged to move between their open and closed positions in the axial direction X-X.

19. The system according to claim 18, wherein the check valve, relief valve and breather float valve are generally axially aligned with the main axis X-X.

\* \* \* \* \*